O. M. TEMPLETON.
VEHICLE CURTAIN LIGHT.
APPLICATION FILED MAR. 13, 1916.

1,253,907.

Patented Jan. 15, 1918.

Oliver M. Templeton,
Inventor

By Geo. P. Kimmel
Attorney

UNITED STATES PATENT OFFICE.

OLIVER M. TEMPLETON, OF INDIANAPOLIS, INDIANA.

VEHICLE-CURTAIN LIGHT.

1,253,907.

Specification of Letters Patent.

Patented Jan. 15, 1918.

Application filed March 13, 1916. Serial No. 83,846.

*To all whom it may concern:*

Be it known that I, OLIVER M. TEMPLETON, a citizen of the United States, residing at Indianapolis, in the county of Marion and State of Indiana, have invented certain new and useful Improvements in Vehicle-Curtain Lights, of which the following is a specification.

The present invention relates to new and useful improvements in automobile curtain lights and more particularly to improved clamping frames for supporting flexible transparent lights in automobile curtains and the like.

An object of my invention is to provide in a simple and light structure an effective frame for holding flexible transparent material in desired positions, the device being particularly adapted for use in connection with the flexible material of an automobile curtain.

Another object of my invention is to provide a frame of the class described which will both hold the transparent material in position and attach the frame to the material forming the automobile curtains. While in the following description my invention will be set forth as applied to an automobile curtain, it is to be of course understood that I do not limit myself to this application of the device.

Other objects and advantages to be derived from the use of my improved curtain light frame will appear from the following detail description and the claim, taken with an inspection of the accompanying drawings, in which—

Figure 1:
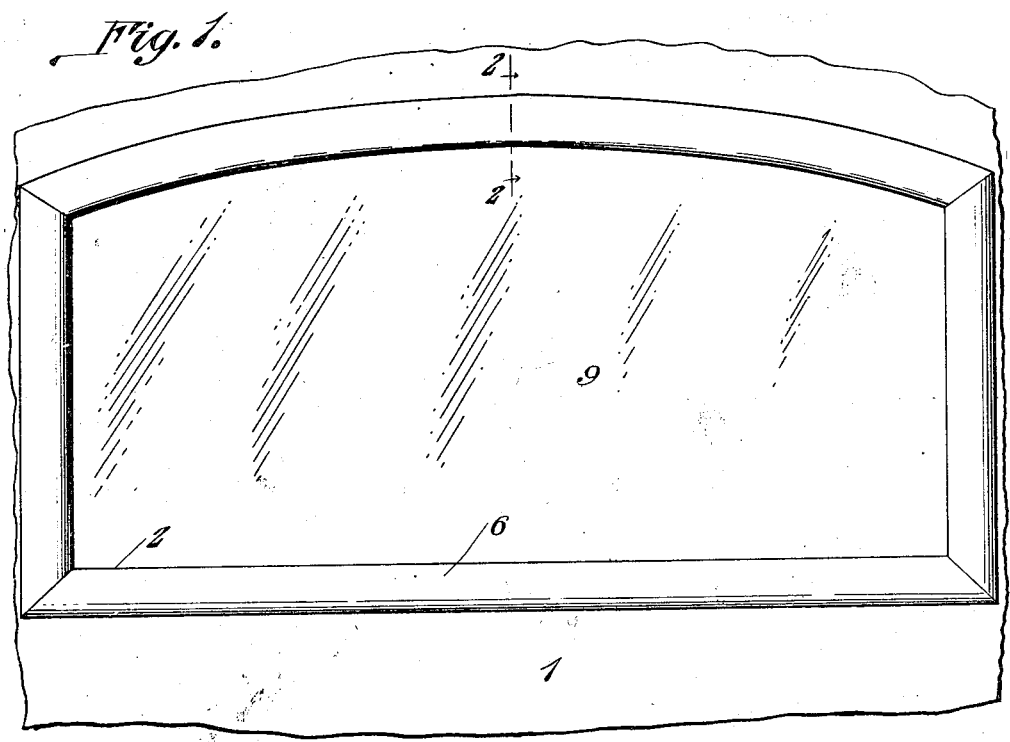
Figure 2:
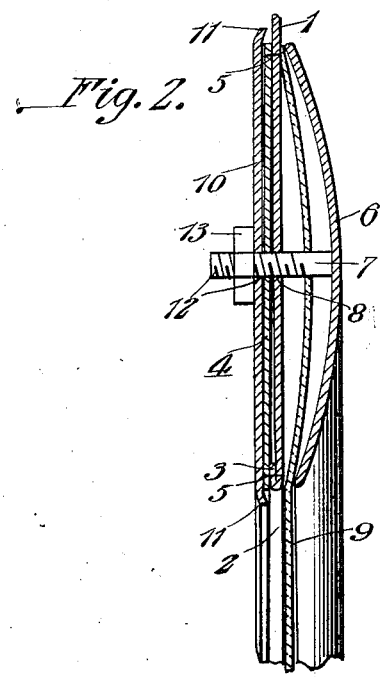
Figure 3:
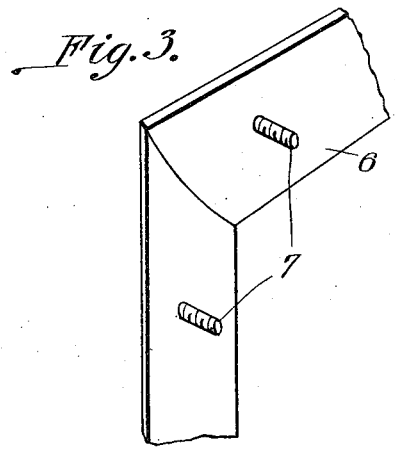

Figure 1 is a side elevational view of a frame embodying the improvements of my invention, Fig. 2 is an enlarged transverse sectional view taken on the line 2—2 of Fig. 1, looking in the direction of the arrows, and Fig. 3 is an enlarged perspective view of one corner of the main frame illustrating the manner in which the fastening members extend therefrom.

Referring more particularly to the drawing, wherein similar characters of reference designate like and corresponding parts throughout the various views, 1 designates the body of the material forming the flexible curtain of an automobile or the like, said body having an opening 2 formed therein, the marginal edge of the body adjacent the opening being folded as at 3, provided with a reinforcing strip 4 and stitched as at 5 to strengthen the material adjacent the opening. My improved automobile curtain light frame comprises a main portion 6 preferably curved in cross section, a plurality of bolts 7 or the like extending therefrom and arranged at fixed intervals about the frame. The bolts are adapted to extend through openings 8 in the body 1 and reinforcing strip 4, and the flexible transparent material to be held by the frame is designated 9 and is adapted to have the marginal edges thereof inserted between the body 1 and the main frame 6. A clamping frame 10 having the free marginal edges thereof inwardly bent as at 11 serves to engage the reinforced portion of the body 1 and the transparent material 9, the bolt 7 passing through an opening 12 therein. A nut 13 is provided on the bolt 7 in order to maintain the clamping frame 10 in engagement with the transparent material 9 and body 1. From the above it will be seen that I have provided an improved holding frame which serves to clamp the transparent material in position and also connect the same to the supporting material.

Of course, it will be understood that with slight modifications my invention may be applied to various uses but the use of the device hereinbefore described more clearly brings out the advantageous features of the invention. It will be seen that should the flexible transparent material become torn in any way it is unnecessary to remove the whole curtain or to rip the transparent material out and sew another piece, it only being necessary to remove the clamping frame and substitute a new piece of transparent material.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters-Patent is:—

The combination with a curtain having a sight opening, said curtain having a plurality of openings adjacent the edge of the sight opening, a curtain light frame including a main frame having a plurality of fastening bolts extending therefrom, a transparent flexible member forming a closure for the sight opening, said flexible member having openings adjacent the outer edge to receive the bolts, the marginal edge of the curtain adjacent the sight opening being folded, a reinforcing element secured to the curtain having openings therein registering with the openings in the curtain, the openings in said curtain and reinforcing element adapted to be received by the bolts, a clamping frame having openings therein to receive the free ends of the bolt, the clamping frame being relatively wider than the main frame, the edges of the clamping frame being bent inwardly at a point opposite the outer ends of the main frame and extending beyond the same, and means for retaining the main frame and clamping frame in close proximity for a purpose specified.

In testimony whereof I affix my signature.

OLIVER M. TEMPLETON.